United States Patent [19]

Sonntag et al.

[11] Patent Number: 4,820,994

[45] Date of Patent: Apr. 11, 1989

[54] PHASE REGULATING CIRCUIT

[75] Inventors: Fritz Sonntag, Munich; Hermann Lang, Weilheim, both of Fed. Rep. of Germany

[73] Assignee: Siemens Aktiengesellschaft, Berlin and Munich, Fed. Rep. of Germany

[21] Appl. No.: 105,670

[22] Filed: Oct. 7, 1987

[30] Foreign Application Priority Data

Oct. 20, 1986 [DE] Fed. Rep. of Germany ....... 3635641

[51] Int. Cl.⁴ .................. H03K 9/06; H03K 5/13; H03L 7/00
[52] U.S. Cl. .................. 328/155; 329/133; 307/262; 307/511; 331/25; 375/118
[58] Field of Search .............. 328/155, 133; 307/262, 307/511; 331/1 A, 17, 25; 375/118, 120

[56] References Cited

U.S. PATENT DOCUMENTS

| | | | |
|---|---|---|---|
| 3,731,219 | 5/1973 | Mader | 331/14 |
| 3,883,817 | 5/1975 | Cliff | 331/1 A |
| 4,019,153 | 4/1977 | Cox, Jr. et al. | 328/155 X |
| 4,066,978 | 1/1978 | Cox, Jr. | 331/1 A |
| 4,242,639 | 12/1980 | Boone | 328/155 |

FOREIGN PATENT DOCUMENTS 2925391 1/1981 Fed. Rep. of Germany .

OTHER PUBLICATIONS

Digital Multiplexer Family Expands Its Horizon Heinz Beetz, Kurt Gasser et al., Public Communication Systems Telecom Report 9 (1986) No. 5.
Halbleiter-Schaltungstechnik U. Tietze Ch. Schenk Springer-Verlag Berlin, Heidelberg, New York, Tokyo, 1983 Mit 1014 Abbildungen.
Texas Instruments Application Report.

Primary Examiner—Stanley D. Miller
Assistant Examiner—Timothy P. Callahan
Attorney, Agent, or Firm—Hill, Van Santen, Steadman & Simpson

[57] ABSTRACT

A phase regulating circuit which converts a slot clock signal at an input into a slot-free clock signal with a low jitter at an output, comprises a phase discriminator, two identical frequency dividers and a regulating and oscillator circuit. The regulating and oscillator circuit comprises a quartz crystal oscillator which supplies an auxiliary frequency, and an adding counter which generates a further signal with a further frequency. One control input of the adding counter is connected for this purpose to the output of the phase discriminator, while a second input of the adding counter is connected to the output of the quartz crystal oscillator. The auxiliary frequency and the further frequency are each connected to an input of an EXCLUSIVE OR gate by which they are added by regular polarity reversal. From this added frequency, a frequency divider obtains the frequency of the clock signal. A plurality of phase regulating circuits can operate using a common quartz crystal oscillator which is of particular interest for digital signal multiplex devices.

5 Claims, 3 Drawing Sheets

PHASE REGULATING CIRCUIT

BACKGROUND OF THE INVENTION

1. Field of the Invention

The present invention relates to a phase regulating circuit comprising a phase discriminator, a first frequency divider whose input serves as an input for a slot clock signal and whose output is connected to the first input of the phase discriminator, a regulating and oscillator component whose input is connected to the output of the phase discriminator and whose output serves to emit a regulated clock signal, and a second frequency divider whose input is connected to the output of the regulator and oscillator component and whose output is connected to a second input of the phase discriminator.

2. Description of the Prior Art

A phase-regulating loop of the type set forth above (phase-locked loop) is disclosed in the book "Halbleiter-Schaltungstechnik" by Tietze et al, 6th Edition, published by Springer-Verlag, Berlin, Heidelberg, New York, Tokyo, 1983, pp. 828–829.

The periodical "Telcom Report", Vol. 9, No. 5, 1986, pp. 261–267 has also described digital signal multiplex devices in which, in the demultiplexer arranged in the receiving path, the clock signal of the respective subsidiary channel is required for its restoration. The restoration of the clock signal is normally carried out using a phase regulating circuit (PLL) in combination with a buffer. Here, the demultiplexed subsidiary channel and its slot clock signal are input into the buffer and read with the low-jitter clock signal obtained from the slot clock signal with the assistance of a high-quality phase regulating circuit. The high-quality phase regulating circuits are needed because of the jitter attenuation requirement.

The regulator and oscillator component generally contains an analog integrator in order to achieve the smallest possible phase deviations. However, an undesired increase in jitter can occur due to the lower cut-off frequency of the integrator.

In a digital signal multiplex device DSMX 2/34, for the restoration of clock signals from sixteen 2-Mbit/s channels an equal number of phase regulating circuits are required.

SUMMARY OF THE INVENTION

The object of the present invention is to reduce the space and cost requirement for a group comprising a plurality of phase regulating circuits, for example in a digital signal multiplex device or distributor multiplexer.

The above object is achieved, according to the present invention and beginning with a phase regulating circuit of the type described above, in that the regulator and oscillator component contains an adding counter for mean value formation, whose control input is connected to the output of the phase discriminator, a quartz crystal oscillator, an EXCLUSIVE-OR gate whose first input is connected to the output of the adding counter and whose second input is connected to the output of the quartz crystal oscillator and to the clock input of the adding counter, and a third frequency divider whose input is connected to the output of the EXCLUSIVE-OR gate and whose output forms the output of the regulator and oscillator component, and that, moreover, the auxiliary frequency of the quartz crystal oscillator is selected to be lower than the frequency of the regulated clock signal multiplied by the division factor of the third frequency divider.

Here, it is advantageous for the output of the quartz crystal oscillator to be connected to the second inputs of the EXCLUSIVE OR gates or a plurality of phase regulating circuits that have no individual quartz crystal oscillator.

In this manner, it is possible to carry out a full integration of a plurality of phase regulating circuits using only one common external quartz crystal oscillator. The circuit expense and the power consumption required in respect of a predetermined self-jitter and no impermissible jitter increase in the jitter attenuation characteristic can be kept low.

In order to regulate a slot clock signal of a middle frequency of 2.048 MHz it is advantageous to select a division factor of 16 for all the frequency dividers, for the adder counter to count up to 2048, and for the quartz crystal oscillator to emit a frequency of 32.76 MHz.

This permits the output of a common quartz crystal oscillator in a digital signal multiplex device DSMX 2/8 to be used four times to drive four similar circuits and with a common quartz crystal oscillator in a digital signal multiplex device DSMX 2/34 the output of the oscillator can be used to drive 16 circuits.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
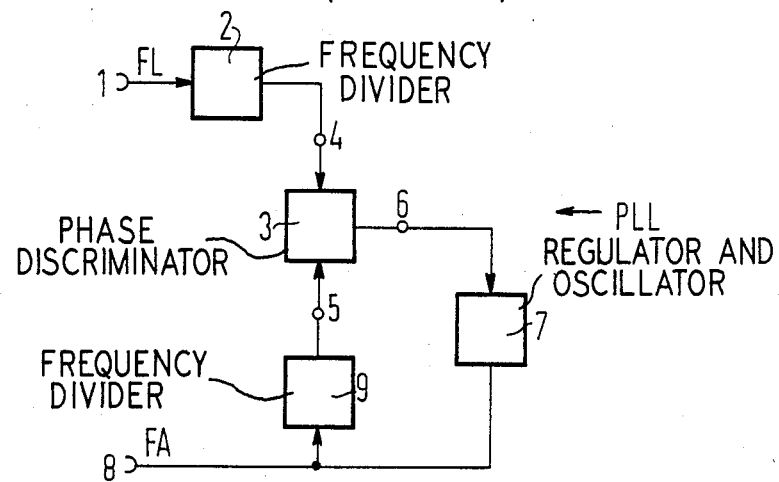
FIG. 1 is a schematic representation of a phase regulating circuit known in the art.

FIG. 1 represents a phase regulating circuit PLL constructed in accordance with the prior art, comprising an input 1 for a slot clock signal having a frequency FL, a frequency divider 2, a phase discriminator 3 having inputs 4 and 5 and an output 6, a regulator and an oscillator component 7, an output 8 for the clock signal regulated by way of the phase regulating circuit PLL, and a frequency divider 9.

Figure 2:
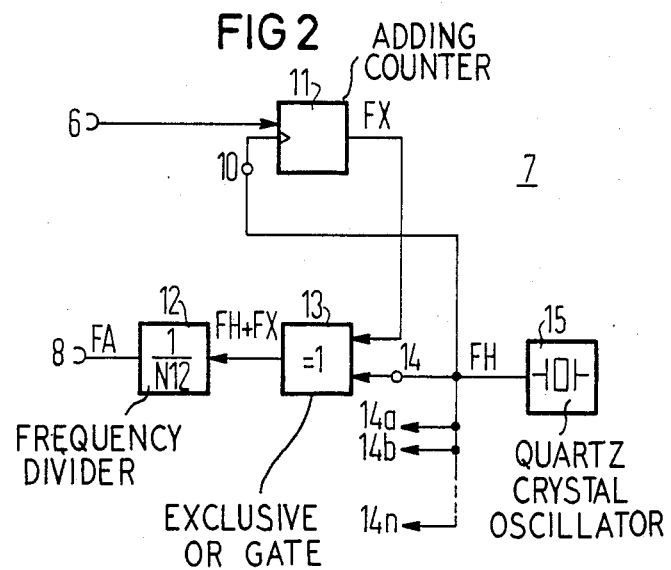
FIG. 2 is a schematic representation of a regulator and an oscillator component constructed in accordance with the present invention for a phase regulating circuit of the type illustrated in FIG. 1.

FIG. 2 is a detailed diagram of the regulator and oscillator component 7. This component comprises an adding counter 11 for mean value formation, a frequency divider 12, an exclusive OR gate 13 and a quartz crystal oscillator 15.

Figure 3:
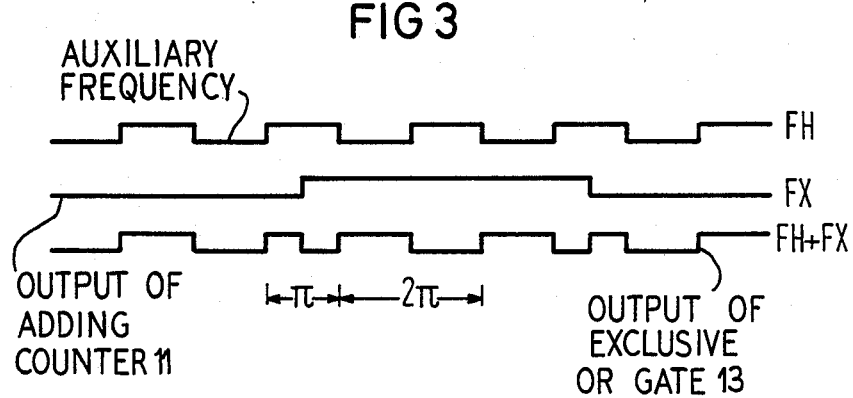
FIG. 3 is a pulse diagram for explaining the mode of operation of the phase regulating circuit illustrated in FIGS. 1 and 2.

FIG. 3 is a pulse plan illustrating the auxiliary frequency FH of the output signal of the quartz crystal oscillator 15, the frequency FX of the output signal of the adding counter 11 and the sum of the frequencies FH+FX of the two signals at the output of the EXCLUSIVE OR gate 13.

The mode of operation of the phase regulating circuit shown in FIGS. 1 and 2 is as follows.

A slot clock signal which has the frequency FL is applied to the input 1 and divided by the frequency divider 2 in the form of a counter in such a manner that a rectangular voltage with only a fluctuating period duration occurs at the input 4 of the phase discriminator 3. The division factor of the frequency divider 2 must take into account a maximum possible jitter which results, for example, from three successive slots. The phase discriminator 3, which is designed as an edge-triggered RS flip-flop, compares this rectangular voltage with that which occurs at the input 5 of the phase discriminator 3 and which has been obtained by division in a frequency divider 9 from the clock signal having the frequency FA, to establish the phase difference. The construction of the frequency divider 9 is identical to that of the frequency divider 2.

For the generation of the clock signal with the frequency FA, the quartz crystal oscillator 15, first of all, supplies a rectangular voltage with an auxiliary frequency FH which is smaller than the frequency FA of the clock signal multiplied by a division factor $N_{12}$ of the frequency divider 12. At a permissible tolerance of the frequency of the read clock signal of $\pm\Delta FA$, $FH < N_{12}(FA-\Delta FA)$ is valid. By regular polarity reversal during a half period of the auxiliary frequency FH with the frequency FX by way of the EXCLUSIVE OR gate 13, the middle frequency of the pulse series with the auxiliary frequency FH is increased to the value FH+FX, where a phase error of $\pi$ occurs at each of the polarity reversal points. By dividing the pulse sequence by the frequency divider 12 this error is reduced to the residual phase error (self jitter)

$$\pi/N_{12} = 1 \text{ UJ}/2N_{12}$$

where 1 UJ=1 unit interval=$2\pi$. The frequency of the read clock signal is therefore $FA=(FH+FX)/N_{12}$.

By way of a control input which releases and blocks the clock input, in accordance with its pulse duty factor, the output signal of the phase discriminator 3 controls the adding counter 11 whose frequency FX is equal to the mean frequency difference between $FH/N_{12}$ and FL, where $N_{12}$ is the division factor of the frequency divider 12. The auxiliary frequency FH directly drives the EXCLUSIVE OR gate 13. The size of the adding counter 11 governs the frequency pull-in range of the clock signal with the frequency FA and therefore also the auxiliary frequency FH.

The cut-off frequency FG of the jitter transmission function is calculated from the expression $$FG=FA/(2\pi N_m N_2)$$

where the indices of the division factors relate to the corresponding frequency dividers and adding counter. As no integrating effect takes place in this phase regulating circuit, no jitter increase occurs.

In addition, a plurality of, for example 3 or 15, phase regulating circuits without quartz crystal oscillators can each be connected to the output of the quartz crystal oscillator 15 by the second input 14a, 14b ... 14n of the respective EXCLUSIVE OR gate 13.

Figure 4:
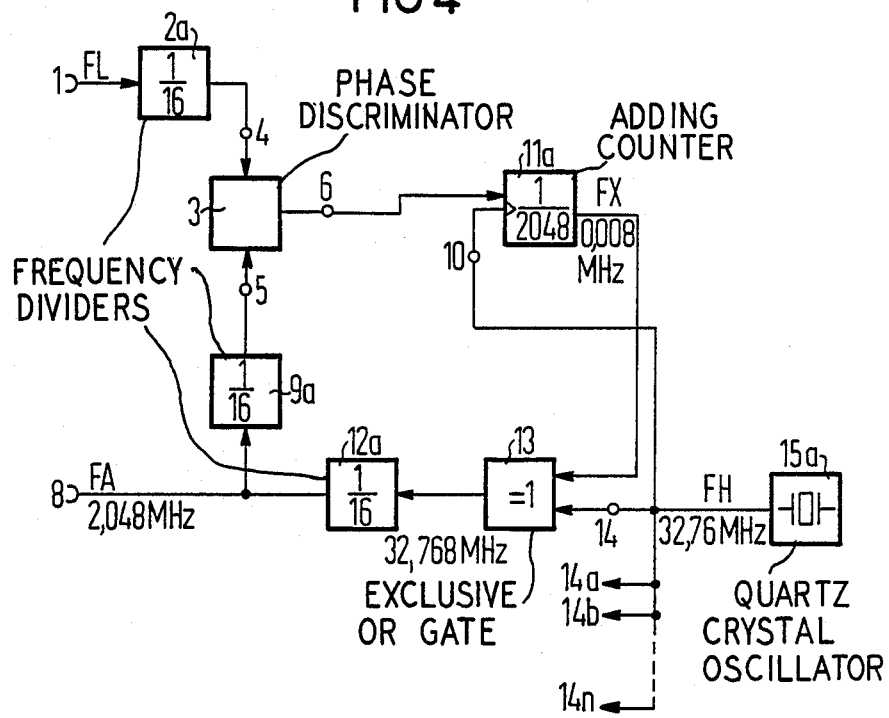
FIG. 4 is a schematic representation of a practical exemplary embodiment of the invention.

FIG. 4 is a circuit diagram of a practical exemplary embodiment of a phase regulating circuit constructed in accordance with the invention. The frequency dividers 2a, 9a and 12a each have a division factor of TF=16; the adding counter 11a counts up to 2048 before it emits an output signal. The quartz crystal oscillator 15a emits an auxiliary frequency FH=32.76 MHz, and the adding counter 11a supplies, on average, a frequency FX=0.008 MHz. A frequency FH+FX=32.768 MHz with a 0.5 UI jitter occurs at the output of the EXCLUSIVE OR gates 13. A clock signal FA=2.048 MHz with a jitter (0.032 UI) reduced the factor of sixteen in the frequency divider 12a is emitted from the output 8.

Figure 5:
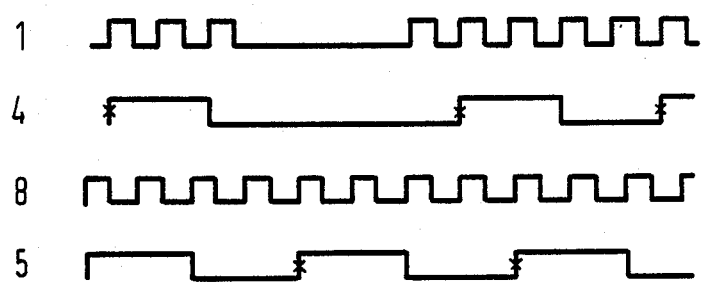
FIG. 5 illustrates diagrams which show the pulses which appear at different points in FIGS. 1 and 4.

FIG. 5 illustrates the pulse shapes at contact points 1, 4, 8 and 5 in FIGS. 1 and 4. The pulse at contact 1 contain a gap (gap clock) due to the three pulses which are missing and this is shown in row 1 of FIG. 5. This signal is divided by four in the divider 2 in the examples according to FIG. 5 whereas in FIG. 4 of the invention, it is divided by a 16 in the divider 2a. The pulse at contact 4 according to FIG. 5 is the pulse at the contact 1 divided by 4. At each second positive pulse signal edge of the pulse at contact 1, a change in status occurs at the pulse at the contact 4. Thus, the gap becomes small relative to the pulse width. The pulse at contact 8 as shown in FIG. 5 contains the same number of pulses as the pulse at contact 1 shown in FIG. 5, however these are distributed more evenly relative to time. According to FIG. 5, one divides by 4 where the pulse at contact 5 results. In the exemplary embodiment according to FIG. 4, however, one divides by 16 in the divider 9a.

If for gaps with less than 4 pulses missing immediately after each other by one divides by 4 and for gaps with less than 16 pulses immediately following each other one divides by 16. Positive signal edges in the pulses at the contact 4 and in the pulses at the contact follow each other alternately which is emphasized by FIG. 5 by the crosses and which is important for the phase detector.

Figure 6:
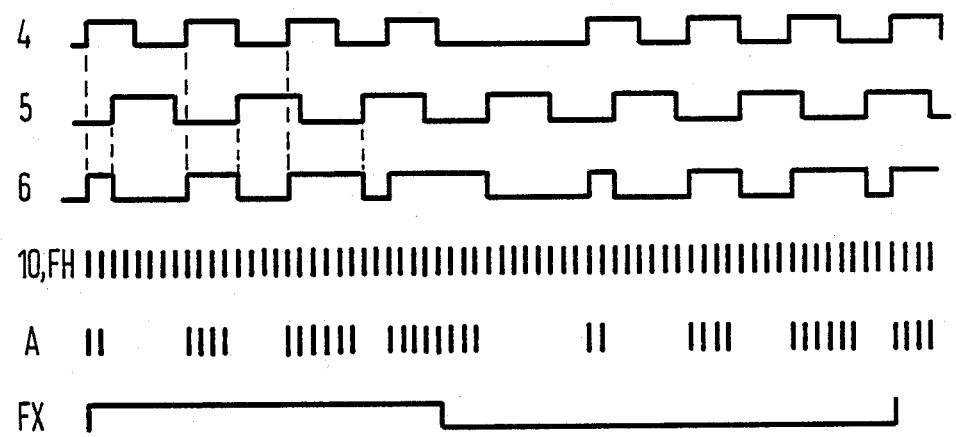
FIG. 6 illustrates diagrams for showing how an RS flipflop is triggered.

FIG. 6 illustrates the functioning of the well known RS flipflop triggered by the signal edge as the phase detector. At each positive signal edge at the contact 4 a positive signal edge develops at contact 6 and at each positive signal edge at contact 5, a negative signal edge develops at contact 6. If the pulse at the contact 4 shifts relative to the pulse at contact 5, the pulse duty factor in the pulse at the contact 6 changes.

In the actual invention, the fourth from the top pulses shown in FIG. 6 shows the pulses at contact 10 which are generated by the oscillator 15a. Due to lack of space, only the effective signal edges of this pulse train are illustrated. As long as the pulse has positive pulses at contact 6, the signal edges at the contact 10 become effective in the adding counter 11a which is shown by the pulse train A in FIG. 6. For the example, according to FIG. 6, it is assumed that the adding counter 11a divides by 32 (in FIG. 4 it divides by 2048). The pulse FX illustrated in FIG. 6 is formed as shown in the bottom curve of FIG. 6. A status change occurs at each sixteenth pulse A. The subsequently adding of FH and FX is shown in FIG. 3 of the invention. The functioning of the exclusive OR gate 13 and the divider 12 is known from literature to those skilled in the art to which the present application is directed.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a phase regulating circuit of the type which comprises a phase discriminator, a first frequency divider whose input serves as an input for a slot clock signal and whose output is connected to a first input of the phase discriminator, a regulator and oscillator component whose input is connected to the output of the phase discriminator and whose output serves to emit a regulated clock signal, and a second frequency divider whose input is connected to the output of the regulator and oscillator component and whose output is connected to a second input of the phase discriminator, the improvement wherein the regulator and oscillator component comprises:

an adding counter for mean value formation, said adding counter including a control input connected to the output of the phase discriminator, and an output;

a quartz crystal oscillator including an output;

an EXCLUSIVE OR gate including a first input connected to said output of said adding counter and a second input connected to said output of said quartz crystal oscillator, said adding counter including a clock input connected to said second input of said EXCLUSIVE OR gate and said EXCLUSIVE OR gate including an output; and a third frequency divider including an input connected to said output of said EXCLUSIVE OR gate and an output forming the output of the regulating and oscillator component, wherein said quartz oscillator provides an auxiliary frequency selected to be lower than the frequency of the regulated clock signal multiplied by the division factor of said third frequency divider.

2. The improved phase regulating circuit of claim 1, and further comprising:

a plurality of phase regulating circuits each including an EXCLUSIVE OR gate, wherein said output of said quartz crystal oscillator is connected to each of said EXCLUSIVE OR gates of said plurality of phase regulating circuits.

3. The improved phase regulating circuit of claim 2, wherein:

for regulating a clock signal of a middle frequency of 2.048 MHz;

each of said frequency dividers is constructed to provide a division factor of sixteen;

said adding counter is constructed to count up to 2048; and said quartz crystal oscillator is constructed to emit an auxiliary frequency of 32.76 MHz.

4. The improved regulating circuit of claim 3, wherein:

said quartz crystal oscillator provides a common four-fold use in a digital signal multiplex device 2-Mbit/s signals are combined to form one 8-Mbit/s signals.

5. The improved regulating circuit of claim 3, wherein:

said quartz crystal oscillator provides a sixteen-fold use in a digital signal multiplex device in which four 8-Mbit/s signals are combined to form one 34 Mbit/s signal.

* * * * *